United States Patent
Berndt et al.

(10) Patent No.: US 8,664,310 B2
(45) Date of Patent: *Mar. 4, 2014

(54) MIXTURE FOR USE IN FORMING A TRANSPARENT COATING ON A TRANSPARENT SUBSTRATE

(75) Inventors: Anett Berndt, Erlangen (DE); Florian Eder, Erlangen (DE); Hans-Dieter Feucht, Renningen (DE)

(73) Assignee: Siemens Aktiengesellschaft, Munich (DE)

( * ) Notice: Subject to any disclaimer, the term of this patent is extended or adjusted under 35 U.S.C. 154(b) by 716 days.

This patent is subject to a terminal disclaimer.

(21) Appl. No.: 12/443,248

(22) PCT Filed: Sep. 26, 2007

(86) PCT No.: PCT/EP2007/060187
§ 371 (c)(1),
(2), (4) Date: Mar. 27, 2009

(87) PCT Pub. No.: WO2008/040666
PCT Pub. Date: Apr. 10, 2008

(65) Prior Publication Data
US 2010/0009195 A1    Jan. 14, 2010

(30) Foreign Application Priority Data

Sep. 29, 2006 (DE) .......................... 10 2006 046 308

(51) Int. Cl.
*C08K 5/541* (2006.01)
(52) U.S. Cl.
USPC ........ 524/261; 524/265; 106/287.1; 106/806; 428/428; 428/432; 428/689; 428/702

(58) Field of Classification Search
USPC .............. 428/428, 432, 689, 702; 106/287.1, 106/806; 524/261, 265
See application file for complete search history.

(56) References Cited

U.S. PATENT DOCUMENTS 4,943,542 A * 7/1990 Hayashi et al. ................. 501/12
5,009,688 A * 4/1991 Nakanishi ...................... 65/17.2
(Continued)

FOREIGN PATENT DOCUMENTS

DE    19918811 A1    11/2000    .............. C03C 17/25
DE    10051724 A1    5/2002    ................ C03C 1/00
(Continued)

OTHER PUBLICATIONS

Bewig et al. (DE 102005020168) English machine translation.*
(Continued)

*Primary Examiner* — David Sample
*Assistant Examiner* — Lauren Colgan
(74) *Attorney, Agent, or Firm* — King & Spalding L.L.P.

(57) ABSTRACT

The present disclosure may provide a mixture for use in forming a transparent coating including a silicon alkoxide precursor and an organic polymer. The silicon alkoxide precursor may have a pH level between 1 and 4. The organic polymer may have an average molecular weight between 5,000 and 50,000 Da. The mixture may include 35% to 65% organic polymer by volume. The organic polymer may be removed from the mixture after application leaving a resultant transparent coating, wherein: the resultant coating has a porosity of ≥35% to ≤65%; a thickness in the range from ≥95 nm to ≤135 nm; pores having an average diameter from ≥5 nm to ≤50 nm; and a diameter distribution according to a lognorm distribution with a half-width of ≤10 nm.

3 Claims, 1 Drawing Sheet

(56) References Cited

U.S. PATENT DOCUMENTS

| | | | |
|---|---|---|---|
| 5,858,462 A * | 1/1999 | Yamazaki | 427/226 |
| 5,916,946 A * | 6/1999 | Poncelet et al. | 524/430 |
| 6,251,523 B1 * | 6/2001 | Takahashi et al. | 428/428 |
| 6,787,191 B2 * | 9/2004 | Hanahata et al. | 427/387 |
| 7,604,866 B2 * | 10/2009 | Ohashi et al. | 428/446 |
| 2005/0031791 A1 | 2/2005 | Sasaki et al. | 427/372.2 |
| 2005/0195486 A1 | 9/2005 | Sasaki et al. | 359/580 |
| 2005/0254084 A1 | 11/2005 | Imoto | 358/1.15 |
| 2006/0154044 A1 * | 7/2006 | Yamada et al. | 428/312.2 |
| 2006/0269724 A1 * | 11/2006 | Ohashi et al. | 428/143 |
| 2006/0281828 A1 * | 12/2006 | Nakayama et al. | 522/71 |
| 2007/0212571 A1 * | 9/2007 | Inoguchi et al. | 428/701 |
| 2009/0220774 A1 * | 9/2009 | Imai et al. | 428/331 |
| 2010/0027123 A1 * | 2/2010 | Imai et al. | 359/586 |
| 2010/0136319 A1 * | 6/2010 | Imai et al. | 428/315.5 |

FOREIGN PATENT DOCUMENTS

| | | | | |
|---|---|---|---|---|
| DE | 10209949 A1 | 9/2003 | | C01B 33/12 |
| EP | 0564134 | 12/1999 | | G02B 1/10 |
| JP | 2004094311 A | 3/2004 | | G06F 9/46 |
| JP | 2006215542 A | 8/2006 | | G02B 1/11 |
| WO | 03/052003 A1 | 12/2002 | | C09D 5/00 |

OTHER PUBLICATIONS

Japanese Office Action, Japan Patent Application No. 2009-529692, 6 pages, Dec. 22, 2011.
German Office Action, German Patent Application No. 10 2006 046 308.0, 7 pages, Apr. 7, 2012.
International Search Report, PCT/EP2007/060187, 6 pages, Sep. 26, 2007.
"Anti-Reflective Coatings of Flowerlike Alumina on Various Glass Substrates by the Sol-Gel Process with the Hot Water Treatment", N. Yamaguchi, et al., Journal of Sol-Gel Science and Technology 33, p. 117-120, Jan. 2005.
"Design of Porous Silicon Antireflection Coatings for Silicon Solar Cells", Strehlke, et al., Materials Science and Engineering, p. 81-86, Jan. 2000.
"Industrielle Umsetzung der Sol-Gel-Technologie für Großflächige Antireflex Beschichtungen", M. Walther, OTTI-Seminar Regensburg, p. 53-67, Sep. 2005.

* cited by examiner

MIXTURE FOR USE IN FORMING A TRANSPARENT COATING ON A TRANSPARENT SUBSTRATE

CROSS-REFERENCE TO RELATED APPLICATIONS

This application is a United States national phase filing under 35 U.S.C. §371 of International Application No. PCT/EP2007/060187, filed Sep. 26, 2007 which claims priority to German Patent Application No. 10 2006 046 308.0, filed Sep. 29, 2006. The complete disclosure of the above-identified application is hereby fully incorporated herein by reference.

TECHNICAL FIELD

The present invention relates to the field of transparent materials, in particular transparent materials whose reflection has been reduced.

BACKGROUND

With many transparent materials, in particular transparent materials based on plastic, such as, for example, polycarbonate etc., there arises the difficulty that said materials sometimes have undesirable reflection properties which make their use difficult or even impossible in many applications.

For this reason numerous attempts have been undertaken to make transparent materials less reflective, in particular by application of further layers.

Toward that end it has been proposed, for example, to reduce reflection by means of what is termed a "flower-like alumina" layer (see Yamaguchi et al, Journal of Sol-Gel Science & Technology, 2005, 33, 117-120). However, this approach requires an annealing step at increased temperatures (approx. 400° C.).

Other proposed coatings include multilayer systems with varying refractive indices, e.g. multilayer systems consisting of $SiO_2$ and $TiO_2$. Here too, however, annealing steps are necessary, mostly at temperatures in excess of 400° C. (see M. Walther, OTTI Seminar Regensburg, September 2005). Other systems use layers consisting of $TiO_2$ and $MgF_2$ (see EP 564 134 B1) in which fluorocarbon resins are provided in addition. The disadvantage of this system lies once again in the difficulty of application.

SUMMARY

According to various embodiments, a transparent coating for a transparent substrate material can be provided which at least partially overcomes the aforementioned disadvantages and in particular is easy to apply.

According to an embodiment, a transparent coating for a transparent substrate material, may be based on $SiO_2$ and may have a porosity of ≥35% to ≤65%.

According to a further embodiment, the thickness of the coating may lie in the range from ≥95 nm to ≤135 nm. According to a further embodiment, the refractive index $n_1$ of the coating may lie in the range from ≥0.8*$\sqrt{n_2}$ to ≤1.2*$\sqrt{n_2}$, where $n_2$ is the refractive index of the substrate. According to a further embodiment, the coating can be a porous full-mold body. According to a further embodiment, the $SiO_2$ coating can be produced by means of a sol-gel method. According to a further embodiment, the method can be based on a sol-gel process. According to a further embodiment, during at least a part of the sol-gel process at least one porosity-inducing component may be present which will be removed and/or destroyed following termination of the sol-gel process. According to a further embodiment, the at least one porosity-inducing component can be a polymer, the average molecular weight of the polymers preferably being ≥5,000 Da to ≤50,000 Da. According to a further embodiment, the polymer can be an organic polymer, preferably selected from the group containing polyethylene glycol, polypropylene glycol, copolymers of polyethylene glycol and polypropylene glycol, polyvinyl pyrrolidone, polyether, alkyl-, cycloalkyl- and/or aryl-substituted polyether, polyester, alkyl-, cycloalkyl- and/or aryl-substituted polyester or mixtures thereof. According to a further embodiment, the polymer can be washed out following termination of the sol-gel process. According to a further embodiment, the polymer can be washed out by means of annealing following termination of the sol-gel process. According to a further embodiment, the silicon can be added in the form of a silicon alkoxide precursor solution. According to a further embodiment, the pH value of the silicon-containing precursor solution can be in the range from ≥1 to ≤4.

According to another embodiment, a transparent coating for a transparent substrate, can be produced as described above.

According to yet another embodiment, an optical component may include a transparent substrate as well as a coating applied and/or arranged on the substrate as described above.

According to a further embodiment, the substrate can be selected from the group containing glass, transparent plastics, preferably selected from the group containing polycarbonate, polyacrylic and mixtures thereof, as well as mixtures thereof.

According to yet another embodiment, in a method for producing an optical component as described above, the coating may be applied to the substrate by dipping and/or spin-coating.

According to yet another embodiment, use of a coating as described above of an optical component as described above can be made for a. optical instruments, b. spectacles, c. headlight housings in the automotive engineering field, d. windows, particularly in the automotive engineering field, and e. cockpit windshields.

BRIEF DESCRIPTION OF THE DRAWINGS

Further details, features and advantages of the subject matter of the invention will emerge from the following description of the associated drawings, in which—by way of example—an exemplary embodiment of an coating according to various embodiments is shown.

DETAILED DESCRIPTION

Figure 1:
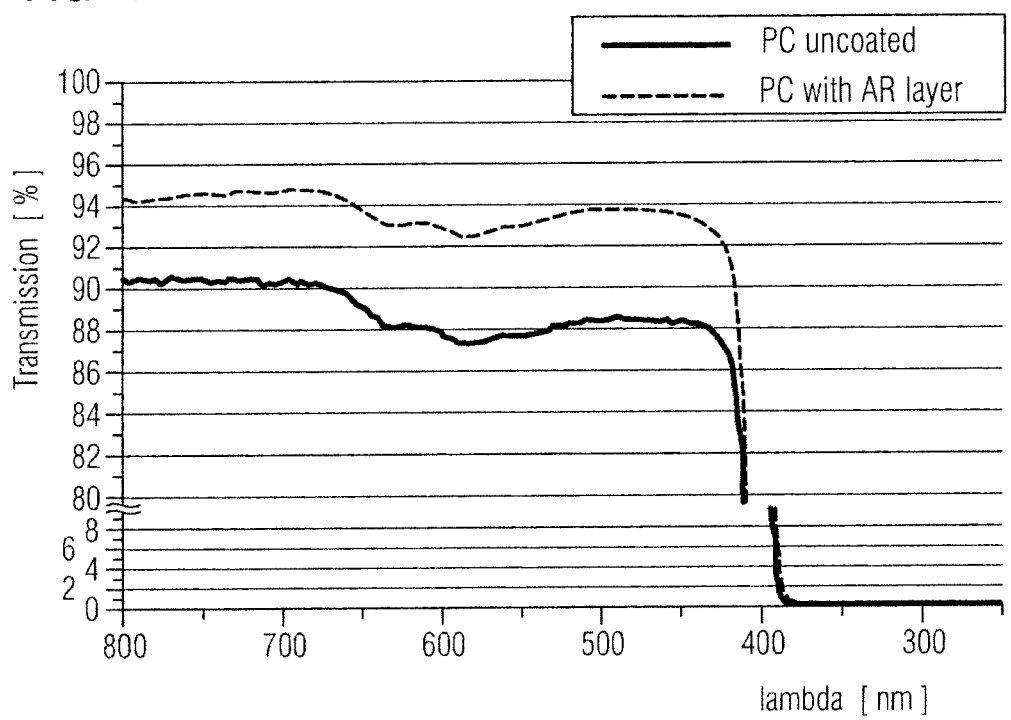
FIG. 1 shows a diagram containing two transmission measurements of a polycarbonate substrate coated according to a first embodiment and an uncoated polycarbonate substrate.

According to various embodiments a transparent coating for a transparent substrate material is proposed which is characterized in that the coating is based on $SiO_2$ and has a porosity of ≥35% to ≤65%.

The description "based on $SiO_2$" within the meaning of the present invention means or includes in particular that the coating contains $SiO_2$ as its main component. In this case preferably ≥70%, more preferably ≤80% and most preferably ≤90% to ≥100 of the coating consists of $SiO_2$.

The term "transparent" within the meaning of the present invention means or includes in particular a transmittance of ≤90% in the wavelength range used in the individual case, in particular in the visible wavelength range.

By means of an $SiO_2$ coating of this kind according to various embodiments, one of more of the following advantages can be achieved in many applications:

The coating is essentially homogeneous and a single coating is sufficient for many applications (in contrast to the multilayer systems cited above).

In most applications according to various embodiments the coating can—as will be described in the following—be applied by simple dipping, which means that complicated and time-consuming application steps, which in particular have to be carried out at high temperature, can be avoided.

As will also be described below, the thickness of the coating produced is in the range of 50-200 nanometers in most applications. The coating is therefore largely insensitive toward thermal and mechanical stress (in particular flexural stress) and only marginally affects component dimensions and tolerances.

According to a more preferred embodiment the porosity of the coating amounts to ≥40% to ≤60%, more preferably ≥45% to ≤55%.

An embodiment is characterized in that the thickness of the coating lies in the range ≥95 nm to ≤135 nm. This has proved particularly favorable for many applications. Preferably the thickness of the coating is ≥100 nm to ≤130 nm.

An embodiment is characterized in that the refractive index $n_1$ of the coating lies in the range $≥0.8*\sqrt{n_2}$ to $≤1.2*\sqrt{n_2}$, where $n_2$ is the refractive index of the substrate. In this case the reflection can be reduced even further for many applications according to various embodiments. The refractive index $n_1$ of the coating preferably lies in the range $≥0.9*\sqrt{n_2} ≤1.1*\sqrt{n_2}$.

An embodiment is characterized in that the coating is essentially a porous full-mold body, in particular a homogeneous porous full-mold body, or forms a body of said kind.

The term "essentially" in this context denotes in particular ≥90 vol-%, preferably ≥95 vol-%, of the coating.

By this means it is possible in many applications according to various embodiments to achieve a coating that is easy to produce and reduces reflections even further.

An embodiment is characterized in that the coating has transmission-enhancing properties, in particular for light in the visible wavelength range.

Preferably the coating is able to increase the transmission of the substrate by ≥2%, preferably by ≥4%, in the wavelength range used in the individual case, in particular in the visible wavelength range.

An embodiment is characterized in that the average diameter of the pores ranges from ≥5 nm to ≤50 nm. In many applications according to various embodiments this has proved particularly favorable in terms of the anti-reflective properties of the coating. Preferably the average diameter of the pores ranges from ≥10 nm to ≤40 nm, more preferably from ≥10 nm to ≤25 nm.

An embodiment is characterized in that the diameter of ≥90% of the pores ranges from ≥5 nm to ≤50 nm.

An embodiment is characterized in that the diameter distribution of the pores of the coating according to various embodiments essentially follows a log-norm distribution with a half-width of ≤10 nm, preferably ≤8 nm, more preferably ≤5 nm.

"Essentially" in this context means that ≥90% of the pores, preferably ≥95% of the pores, and most preferably ≥98% of the pores follow this distribution.

A distribution of this kind has proved particularly favorable for many applications according to various embodiments, since an optically particularly homogeneous coating can thus be achieved.

An embodiment is characterized in that the coating is produced by means of a sol-gel method.

According to another embodiment, a method for producing a transparent coating for a transparent substrate material, may be based on a sol-gel process.

The description "sol-gel process" or "sol-gel method" within the meaning of the according to various embodiments means or includes in particular all processes and/or methods in which silicon precursor materials, in particular silicon halogenides and/or silicon alkoxides, are subjected in solution to hydrolysis and subsequent condensation.

An embodiment is characterized in that during at least a part of the sol-gel process at least one porosity-inducing component is present which will be removed and/or destroyed following termination of the sol-gel process.

An embodiment is characterized in that the at least one porosity-inducing component is a polymer, the average molecular weight of the polymer preferably being ≥5,000 Da to ≤50,000 Da, more preferably ≥10,000 Da to ≤20,000 Da.

An embodiment is characterized in that the polymer is an organic polymer, preferably selected from the group containing polyethylene glycol, polypropylene glycol, copolymers of polyethylene glycol and polypropylene glycol, polyvinyl pyrrolidone, polyether, alkyl-, cycloalkyl- and/or aryl-substituted polyether, polyester, alkyl-, cycloalkyl- and/or aryl-substituted polyester, in particular polyhydroxy butyrate or mixtures thereof.

General groups/molecule definition: General groups or molecules, such as e.g. alkyl, alkoxy, aryl etc., are claimed and described within the description and the claims. Unless described otherwise, the following groups are preferably used within the generally described groups/molecules in the scope of the present invention:

Alkyl: linear and branched C1-C8 alkyls

Long-chain alkyls: linear and branched C5-C20 alkyls

Alkenyl: C2-C6 alkenyl

Cycloalkyl: C3-C8 cycloalkyl

Alkoxide/alkoxy: C1-C6 alkoxy, linear and branched

Long-chain alkoxide/alkoxy: linear and branched C5-C20 alkoxy

Aryl: selected from aromatic compounds having a molecular weight below 300 Da

Polyether: selected from the group containing H—(O—$CH_2$—CH(R))$_n$—OH and H(O—$CH_2$—CH(R))$_n$—H, where R is independently selected from: hydrogen, alkyl, aryl, halogen, and n from 1 to 250

Substituted polyether: selected from the group containing $R_2$—(O—$CH_2$—CH($R_1$))$_n$—$OR_3$ and R2—(O—$CH_2$—CH($R_2$))$_n$—$R_3$, wherein $R_1$, $R_2$, $R_3$ is independently selected from: hydrogen, alkyl, long-chain alkyls, aryl, halogen, and n is in the range from 1 to 250

Ether: The compound $R_1$—O—$R_2$, where each $R_1$ and $R_2$ are independently selected from the group containing hydrogen, halogen, alkyl, cycloalkyl, aryl, long-chain alkyl Unless stated otherwise, the following groups/molecules are more preferred groups/molecules within the general groups/molecule definition:

Alkyl: linear and branched C1-C6 alkyl,

Alkenyl: C3-C6 alkenyl

Cycloalkyl: C6-C8 cycloalkyl

Alkoxy, alkoxide: C1-C4 alkoxy, in particular isopropyloxide

Long-chain alkoxy: linear and branched C5-C10 alkoxy, preferably linear C6-C8 alkoxy Polyether: selected from the group containing H—(O—CH$_2$—CH(R))$_n$—OH and H(O—CH$_2$—CH(R))$_n$—H, where R is independently selected from: hydrogen, alkyl, aryl, halogen, and n is in the range from 10 to 250.

Substituted polyether: selected from the group containing R$_2$—(O—CH$_2$—CH(R$_1$))$_n$—OR$_3$ and R$_2$—(O—CH$_2$—CH(R$_2$))$_n$—R$_3$, where R$_1$, R$_2$, R$_3$ is independently selected from: hydrogen, alkyl, long-chain alkyls, aryl, halogen, and n from 10 to 250.

An embodiment is characterized in that the polymer is washed out following termination of the sol-gel process.

An embodiment is characterized in that the polymer is washed out following termination of the sol-gel process by means of annealing, in particular at a temperature of ≥80° C. to ≤100° C., preferably with water.

An embodiment is characterized in that the polymer is burned out following termination of the sol-gel process, in particular at a temperature of ≥250° C.

An embodiment is characterized in that the silicon is added in the form of a silicon alkoxide precursor solution.

An embodiment is characterized in that the pH value of the silicon-containing precursor solution is in the range from ≥1 to ≤4.

According to yet another embodiment, a transparent coating for a transparent substrate can be produced in accordance with the method according to various embodiments.

According to yet another embodiment, an optical component may comprise a transparent substrate as well as a coating applied and/or arranged on the substrate according to various embodiments.

An embodiment is characterized in that the substrate is selected from the group containing glass, transparent plastics, preferably selected from the group containing polycarbonate, polyacrylic and mixtures thereof, as well as mixtures thereof.

According to yet another embodiment, a method for producing an optical component is characterized in that the coating is applied to the substrate by dipping and/or spin-coating.

According to yet another embodiment, a use of a coating according to various embodiments and/or an optical component according to various embodiments can be made for
optical instruments
spectacles
headlight housings in the automotive engineering field
windows, particular in the automotive engineering field
cockpit windshields The aforementioned components and the claimed components that are described in the exemplary embodiments and are to be used according to the invention are not subject to any special exception conditions in terms of their size, formal design, choice of material and technical design concept, so the selection criteria known in the field of application can be applied without restriction.

Figure 2:
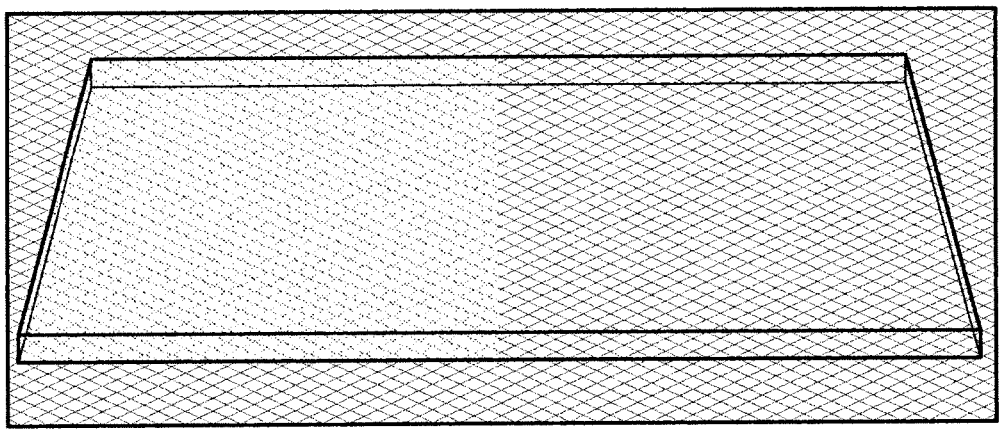
FIG. 2 is a photograph of a polycarbonate substrate, half of which is coated according to a first embodiment.

FIGS. 1 and 2 relate to the example I described below:

EXAMPLE I

A polycarbonate-based optical component was produced as follows:

First, two solutions were prepared:

Solution 1: 4 g polyethylene glycol was prepared in 50 ml ethanol and water was slowly added while stirring until complete dissolution occurred. Next, 4 drops 1N HCl were added.

Solution 2: 4 ml tetraethoxysilane in 20 ml EtOH

Solution 2 was then filled to 50 ml with solution 1 and stirred for 2 h.

The polycarbonate substrate was conditioned by means of flame silanization in order to increase the bonding between substrate and coating.

The polycarbonate substrate was then dip-coated with the solution (rate 50 mm/min). It was then dried in air and annealed in the oven at 100° C. for 2 h. After cooling down it was stored in water for 1 min.

The porosity of the coating in this case was 55%.

FIG. 1 shows a diagram containing two transmission measurements of the polycarbonate substrate coated according to example I and the uncoated polycarbonate substrate. An improvement in transmission by approx. 5% can be seen.

FIG. 2 shows a photograph of a polycarbonate substrate, half of which was coated according to example I. It can clearly be seen that reflection has been significantly reduced.

The invention claimed is:

1. A mixture for use in forming a transparent coating on a transparent substrate material, the mixture comprising:
   a silicon alkoxide precursor having a pH level between 1 and 4; and
   an organic polymer selected from the group consisting of polyethylene glycol, polypropylene glycol, copolymers of polyethylene glycol and polypropylene glycol, polyvinyl pyrrolidone, polyether, alkyl-, cycloalkyl- and/or aryl-substituted polyether, polyester, alkyl-, cycloalkyl- and/or aryl-substituted polyester or mixtures thereof, the organic polymer having an average molecular weight between 5,000 and 50,000 Da;
   wherein the organic polymer makes up between 35 to 65% of the mixture by volume;
   the organic polymer operable to be removed from the mixture after application to the transparent substrate material leaving a resultant transparent coating;
   wherein the resultant coating has a porosity of ≥35% to ≤65%;
   wherein the resultant coating has a thickness in the range from ≥95 nm to ≤135 nm;
   wherein the resultant coating includes pores having an average diameter from ≥5 nm to ≤50 nm; and
   wherein the pores have a diameter distribution according to a log-norm distribution with a half-width of ≤10 nm.

2. The mixture according to claim 1, wherein the refractive index $n_1$ of the coating lies in the range from ≥0.8*$\sqrt{n_2}$ to ≤1.2*$\sqrt{n_2}$, where $n_2$ is the refractive index of the transparent substrate material.

3. The mixture according to claim 1, wherein the coating is a porous full-mold body.

* * * * *